April 13, 1926.

R. M. WOLFE

CASTER

Filed Feb. 7, 1923

1,580,461

Ralph M. Wolfe, Inventor
By Hicks Ackleman,
Attorney

Patented Apr. 13, 1926.

1,580,461

UNITED STATES PATENT OFFICE.

RALPH M. WOLFE, OF LANCASTER, PENNSYLVANIA.

CASTER.

Application filed February 7, 1923. Serial No. 617,601.

*To all whom it may concern:*

Be it known that I, RALPH M. WOLFE, a citizen of the United States of America, and resident of Lancaster, in the county of Lancaster and State of Pennsylvania, have invented certain new and useful Improvements in Casters, of which the following is a specification.

This invention relates to casters which can be used in connection with all classes of furniture, or can be used as a caster wheel for trucks and the like, the said invention having for an object the provision of novel construction obviating the use of king bolts; and the said invention also has for an object the provision of novel means whereby the parts can be readily assembled in operative relation to the truck or element to be supported.

It is a further object of this invention to produce an anti-friction caster in which the anti-friction elements are held in spaced relation to one another and yet left free to rotate as the device is being used.

With the foregoing and other objects in view, the invention consists in the details of construction and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
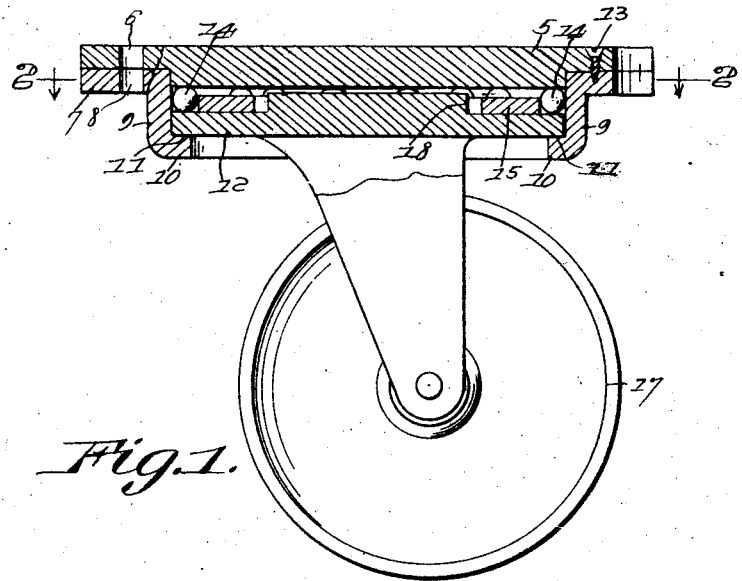
Figure 1 illustrates a sectional view of a caster embodying the invention.
Figure 2:
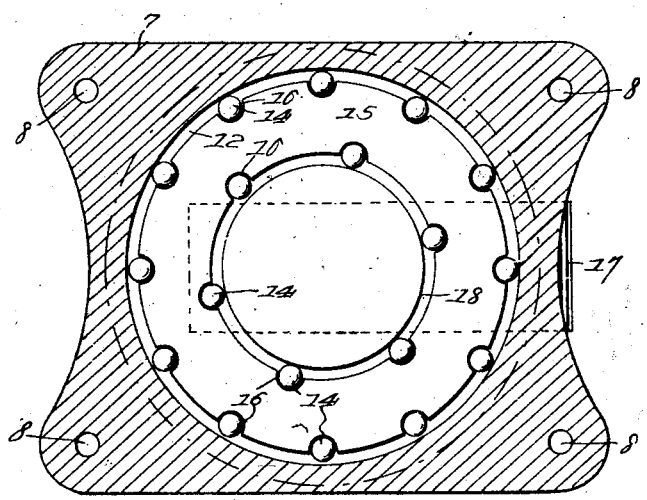
Figure 2 illustrates a sectional view on a line corresponding with the line 2—2 of Fig. 1.

In these drawings, 5 denotes a plate which may be termed the upper plate with apertures 6 in the corners, through which fastenings may be applied for anchoring it to the object which it is to support. A second plate 7 has its edge conforming to the contour of the plate 5, and it is provided with apertures 8 which register with the apertures 6 to receive the said fastenings. The plate 7 has a depending annular flange 9 and a transversely extending flange 10 integral therewith, the latter forming a shoulder 11 on which the head 12 of the caster wheel engages to prevent its displacement, it being understood that the said head of the caster wheel is interposed between the flange 11 and the lower surface of the plate 5. The plates 5 and 7 are secured together by fastenings 13 such as screws or the like, and the parts are thereby held in assembled relation to one another.

The space between the head 12 and the plate 5 is of such a depth as to accommodate anti-friction members 14 which are here shown as balls and these balls sustain the weight of the object to which the plate 5 is secured.

The anti-friction members are held in spaced relation to one another by a ring 15 that is seated in the space between the plate 5 and the head, and this ring has recesses 16 in its two edges that form seats in which the anti-friction members are lodged so that the said anti-friction members may not change their positions with relation to one another as to their spacing as they operate when the caster is being used.

The head is supported on a caster wheel 17 by the usual method, and the said head has an annular shoulder 18 which is in such spaced relation to the depending flange 9 of the plate 7 to accommodate the ring 15 and the anti-friction members. One set of anti-friction members bears against the inner surface of the depending flange 9, whereas the other set of anti-friction members engages the shoulder 18 of the head.

By reason of the arrangement of parts just stated, the head is free to rotate with relation to the plate 5, and yet dislodgement of the head and the parts associated with it is prevented by reason of its being confined by the annular flange 9 and the laterally disposed flange 10.

The device comprises comparatively few inexpensive parts which can be readily assembled, and when assembled they can not be disarranged except by the removal of the fastenings that connect the plates 5 and 7 together.

I claim:

As an article of manufacture, a furniture caster comprising a plate having a reduced margin, a central portion of greater thickness than the margin and apertures for attaching the plate to an article of furniture, said apertures being in spaced relation to each other, a connecting member attached to the plate and provided with apertures which register with the apertures through the margin of the plate, a rim member which overlies the reduced margin of the plate, said rim having an inward extending lower portion appropriately spaced from the plate, a caster carrying member having a raised central portion, a spacing ring located in an intermediate portion of the chamber formed between the plates, said spacing ring having in each margin ball receiving recesses, inner and outer series of balls which are held spaced by the recesses and engage with the plates of the caster carrying frame and with the plate attached thereto.

RALPH M. WOLFE.